No. 761,072. PATENTED MAY 31, 1904.
G. E. HARTER.
GARDEN IMPLEMENT.
APPLICATION FILED OCT. 26, 1903.
NO MODEL. 2 SHEETS—SHEET 1.
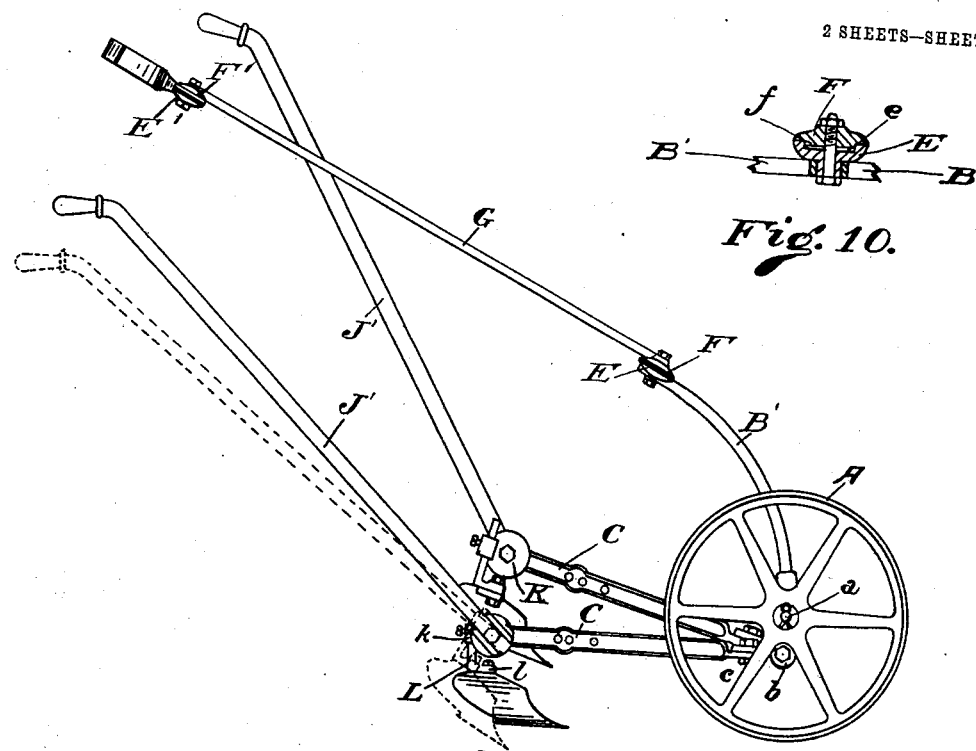
Fig. 10.
Fig. 1.
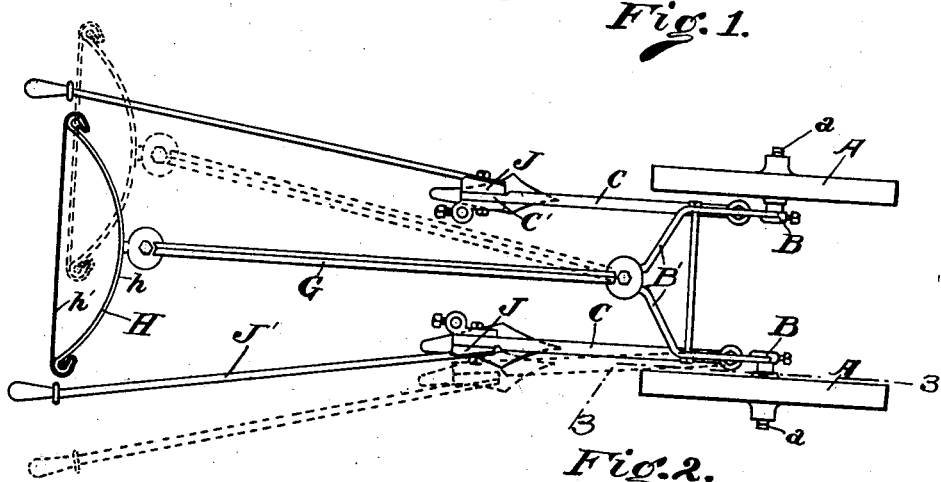
Fig. 2.
Witnesses
Margaret Hackett
Joseph R. Rohrer.
Inventor
George E. Harter
By Stein, Heidman Millhope
Attorneys No. 761,072. PATENTED MAY 31, 1904.
G. E. HARTER.
GARDEN IMPLEMENT.
APPLICATION FILED OCT. 26, 1903.
NO MODEL. 2 SHEETS—SHEET 2.
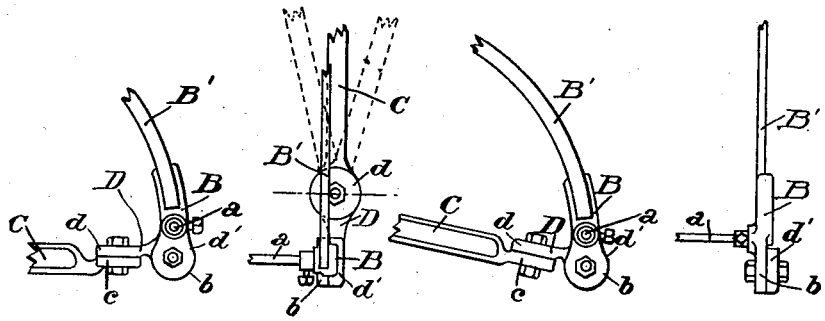
Fig. 3.   Fig. 4.   Fig. 5.   Fig. 6.
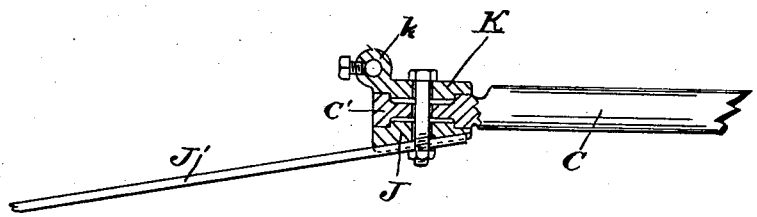
Fig. 7.
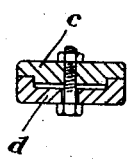 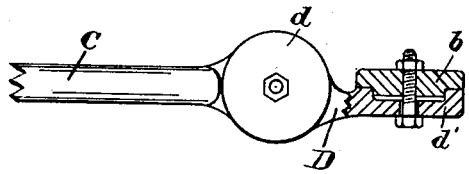
Fig. 8.   Fig. 9.
Witnesses
Margaret Hackett
Joseph R. Rohrer
Inventor
George E. Harter
By Stein, Heideman Mahlhope
Attorneys No. 761,072.

Patented May 31, 1904.

UNITED STATES PATENT OFFICE.

GEORGE E. HARTER, OF TOLEDO, OHIO, ASSIGNOR TO THE HICKOX, MULL & HILL COMPANY, OF TOLEDO, OHIO.

GARDEN IMPLEMENT.

SPECIFICATION forming part of Letters Patent No. 761,072, dated May 31, 1904.

Application filed October 26, 1903. Serial No. 178,586. (No model.)

*To all whom it may concern:*

Be it known that I, GEORGE E. HARTER, a citizen of the United States, and a resident of Toledo, in the county of Lucas and State of Ohio, have invented certain new and useful Improvements in Garden Implements, of which the following is a full, clear, and exact description, reference being had to the accompanying drawings, which form a part of my specification.

My invention relates to garden implements of the class in which the drag-bars are pivoted to the wheels or axles and the power for operating the implement is produced by the operator himself, who applies the pressure of his body as he walks forward to the pushing forward of the wheels which carry the implement.

My invention has for its object certain improvements and adjustments whereby the operator can readily walk between the rows while cultivating on both sides of the rows and also improvements in the manner of attachment of the drag-bars and of the implements themselves, so that the hoe or other implement which is being used at the same time may be lifted out of the way in order to pass obstacles or may be adjusted to any position to fit the work required of it.

The advantages of my invention will appear more fully as I proceed with my specification.

In the drawings, Figure 1 is a side elevation of my improved garden implement, one drag-bar being shown raised from the ground as it would be in the act of passing an obstacle. Fig. 2 is a top plan view of the same, the hoes in this figure being shown as resting on the ground. Fig. 3 is a detail section on the line 3 3 of Fig. 2. Fig. 4 is a top plan view of the same. Fig. 5 is a view similar to Fig. 3, with the drag-bar shown in an elevated position. Fig. 6 is a front elevation of the same. Fig. 7 is a detail on a large scale, illustrating the manner of attachment of the handle-bar and drag-bar, the disks being shown in section. Fig. 8 is a characteristic section through any two of the bearing-disks. Fig. 9 is a detail of the forward end of one of the drag-bars on a large scale, with the vertical bearing-disks shown in a horizontal section; and Fig. 10 is a vertical section showing the manner of attachment of the push-bar G to the arch B'.

A A are the ground-wheels, to which the drag-bars are attached and to which the power is applied for pushing the implement forward. The ground-wheels A, as shown in the drawings, are journaled on short stub-axles $a$, which are secured by set-screws or in any other convenient manner to castings B. To the upper ends of these castings are secured the ends of the arch B', their lower ends terminating in flat disk bearings $b$, with holes threaded through their centers. Drag-bars C are coupled to the castings B in the following manner: Each drag-bar terminates in a flat disk horizontal bearing-surface $c$. For each drag-bar is provided a casting D, comprising two flat disk bearing-surfaces $d$ $d'$ at either end, the planes of said bearing-disks being at right angles to each other. One of these bearing-disks, $d$, is bolted to the bearing-disk $c$ on the end of the drag-bar, and the other, $d'$, is bolted to the bearing-disk $b$ on the end of the casting B. It is thus apparent that a universal joint is formed, so that the drag-bar may be raised or lowered or moved in a horizontal direction, so that it may be placed in any desired position. The bearing-disks $b$ and $c$ are preferably threaded, so that the nuts on the ends of the bolts which secure the bearing-surfaces together when tightened up act as lock-nuts. Such construction, however, is not essential to my invention. At the upper end of the arch is secured a disk E, provided with annular socket $e$ in its upper face, in which fits a boss $f$ on the face of a disk F, to which is secured the lower end of the push-bar G. (See Fig. 10.) A breast-yoke H, comprising the yoke $h$ and the band $h'$, connecting the end of said yoke, is secured to the upper end of the push-bar G in a similar manner. It is thus apparent that when it is desired to cultivate on both sides of the rows, the operator desiring to walk between the rows, the breast-yoke may be pushed to one side by loosening the bolts which secure the disks E F and E' and F' together and the yoke adjusted so as to bear properly against the body of the operator.

The rear ends of the drag-bars terminate in disks C', which are provided on each face with bearing-surfaces engaging on one side the disk J, secured to the end of the handle-bar J', and on the other side the disk K, provided with a socket $k$, which receives the shank L, supporting the tool. The handle-bars are arranged in planes at an angle to the drag-bars, so that the tools may be brought together without interfering with the action of the push-bar. (See Fig. 2.) The bearing-disks C', J, and K are bolted together in any convenient manner, and the shank L, which supports the implement, is adjustable up and down in the socket $k$ by means of a set-screw. The tool M is bolted to a right-angular projection $l$ on the end of the shank L, and it is thus evident that the tool may be turned in any direction and that its position may be brought forward or set back by turning the shank L in its socket.

It is apparent from the arrangement of the disk-bearings J, C', and K and the arrangement of the shank L and its method of attachment to the tool M that either the handle or the tool may be put in any position, depending upon the will of the operator. It is also apparent that by the arrangement of the universal joint described, by which the drag-bars are attached to the casting B, the drag-bars themselves may be adjusted to any position.

By employing the construction I have illustrated and described the tools or implements may be adjusted or swung around to any desired position that may be found necessary by reason of the inequalities in the shanks or other parts of the machine, and the tools can also be made to enter the ground to equal depths and the work of the different tools be made similar in every respect. By my improved construction the handles may be adjusted to any desired height or angle without the necessity of loosening a bolt, as the same bolt holds the tool-holder disk as well as the handle-bar disks, and the friction that will hold the tool-holder disk rigidly in position will allow the handle-bars to move up and down on account of the leverage afforded by their length.

I have also described and illustrated the ground-wheels as mounted on stub-axles; but it is apparent that a single-length axle may be used, and I do not wish to be understood as limiting myself to the precise construction herein set forth, as the construction may be modified in a number of details without departing from the spirit of my invention; but What I do claim as my invention, and wish to secure by Letters Patent, is—

1. A garden implement comprising axles, ground-wheels mounted thereon, a push-bar, mechanism intermediate of the axles and said push-bar whereby the latter may have lateral adjustment, in combination with one or more drag-bars adapted to carry the working tools, means intermediate of the axles and the ends of said drag-bars and provided with bearing-surfaces at right angles to each other, and handle-bars connected with said drag-bars whereby the latter are controlled, substantially as shown and in the manner described.

2. A garden implement comprising axles, ground-wheels mounted thereon, castings secured to said axles, and a push-bar having controllable connection with said axles, in combination with drag-bars adapted to carry the working tools, said drag-bars and the castings provided with bearing-surfaces extending in different planes and so secured together as to permit of movements of the drag-bars in planes substantially at right angles to each other, and handle-bars controlling the drag-bars, substantially as shown and for the purpose described.

3. A garden implement comprising axles, and ground-wheels mounted thereon, castings secured to said axles and provided with flat disk bearing-surfaces at their lower ends, a push-bar secured to said axles, in combination with drag-bars adapted to carry the working tools or implements, said drag-bars terminating in flat disk bearing-surfaces, castings intermediate of the ends of said drag-bars and the castings secured to the axles, and provided with flat disk bearing-surfaces at right angles to each other, and handle-bars secured to said drag-bars whereby the action of the implement may be controlled, substantially as shown and in the manner set forth.

4. A garden implement comprising axles, ground-wheels mounted thereon, and castings secured to said axles, said castings having flat disk bearing-surfaces at their lower ends, in combination with drag-bars adapted to carry the working tools, said drag-bars terminating in flat disk bearing-surfaces at right angles to each other, castings intermediate of the ends of the drag-bars and the castings secured to the axles, said intermediate castings having flat disk bearing-surfaces at right angles to each other and providing universal joints for the drag-bars whereby the drag-bars may have adjustment independent of each other, tool-carrying disks secured to the opposite ends of the drag-bars, handle-bars secured to the drag-bars, and a push-bar secured to the axle, substantially as shown and in the manner described.

5. A garden implement comprising axles, ground-wheels mounted thereon, drag-bars terminating in flat disk bearing-surfaces, castings intermediate of the ends of the drag-bars and said axles and having flat disk bearing-surfaces adapted to form universal joints for said drag-bars, in combination with tool-carrying disks adapted to fit against the flat bearing-surfaces on the ends of the drag-bars, said disks provided with sockets for the reception of the tool-supporting shanks, handle-bars secured to the ends of the drag-bars controlling the movement thereof, and a push-bar having connection with the axles, substantially as shown and in the manner set forth.

6. A garden implement comprising axles, ground-wheels mounted thereon, drag-bars terminating in flat disk bearing-surfaces, castings mounted on the axles, to one end of which said drag-bars are secured, an arch secured to the opposite ends of said castings, said arch provided with a flat disk bearing-surface, a push-bar provided with a flat bearing-surface adapted to bear against and be secured to the flat disk bearing-surface on the arch, in combination with working tools secured to the free ends of the drag-bars, and handle-bars secured to said free ends of the drag-bars whereby the action of the latter may be controlled, substantially as shown and in the manner described.

7. A garden implement comprising axles, and ground-wheels mounted thereon, castings secured to said axles and provided with flat disk bearing-surfaces at their one end, an arch whose ends are secured to the other ends of the castings, said arch provided with a flat horizontal bearing-surface, a push-bar provided with a flat bearing-surface adapted to bear against the horizontal flat surface on the arch and secured thereto, drag-bars terminating in flat disk bearing-surfaces, castings comprising two flat disk bearing-surfaces at right angles to each other and adapted to be secured to the ends of the drag-bars and the flat disk bearing-surface of the castings secured to the axles, in combination with tool-carrying disks adapted to be secured to the free end of the drag-bars, said disks provided with sockets adapted to receive the shanks of the tools, and handle-bars having disk bearing-surfaces bearing against and secured to the rear or free ends of the drag-bars on opposite sides of the tool-carrying disks, substantially in the manner and for the purpose set forth.

8. A garden implement comprising axles, ground-wheels mounted thereon, castings secured to said axles, an arch secured to said castings and provided with a flat horizontal, disk bearing-surface, a push-bar provided with flat, disk bearing-surfaces at its ends, the one adapted to bear on the horizontal, disk bearing-surface on the arch and secured thereto, a breast-yoke provided with a flat disk bearing-surface bearing against and being adjustably secured to the flat, disk bearing-surface on the upper end of said push-bar, drag-bars terminating in flat, disk bearing-surfaces, means intermediate of and secured to the ends of the drag-bars and said castings and provided with flat, disk bearing-surfaces extending in planes at right angles to each other, tool-carrying disks provided with sockets and adjustably secured to the rear or free end of the drag-bars, handle-bars provided with flat bearing-surfaces at their one end and adapted to be adjustably secured to the rear ends of the drag-bars and on opposite sides from the tool-carrying disks, and means for securing the tools or implements within said sockets, substantially as shown and for the purpose described.

9. A garden implement comprising axles, ground-wheels mounted thereon, drag-bars, and castings intermediate of the ends of the drag-bars and the axles, said castings formed to provide universal joints for the drag-bars with the axles, an arch connected with the axles, and provided with a flat horizontal bearing-surface, push-bar, provided with flat disk bearing-surfaces at its ends, one of said flat disk bearing-surfaces bearing on the horizontal flat surface of the arch and adjustably secured thereon, and a breast-yoke having a flat disk bearing-surface adapted to be adjustably secured to the flat disk bearing-surface at the opposite end of said push-bars whereby the action of the latter may be controlled, substantially as shown, and for the purpose described.

10. In a garden implement comprising axles, ground-wheels mounted thereon, drag-bars terminating in flat disk bearing-surfaces, means intermediate the ends of the drag-bars and the axles whereby said drag-bars are provided with universal joints, tool-carrying disks provided with sockets and adjustably secured to the rear or free end of said drag-bars, tool-carrying shanks arranged to pass through said sockets, means for adjustably securing said shanks in the sockets, and handle-bars provided with flat disk bearing-surfaces adapted to be adjustably secured to the flat bearing-surfaces at the rear ends of the drag-bars, in combination with an arch provided with a horizontal flat bearing-surface and secured to the axles, push-bar having flat bearing-surfaces at its end, one of these flat bearing-surfaces adjustably secured upon the flat bearing-surface of the arch, and a breast-yoke adjustably secured to the other end of said push-bar, substantially as shown and in the manner described.

11. A garden implement comprising axles, ground-wheels mounted thereon, a push-bar having controllable connection with said axles, drag-bars adapted to carry the working tools, mechanism intermediate of the axles and the ends of the drag-bars and provided with flat, disk bearing-surfaces extending in planes substantially at right angles to each other, to permit movement of the drag-bars in different planes, mechanism intermediate of the rear end of the drag-bars and the working tools whereby the latter may have adjustment to any desired position, and handle-bars adjustably connected with said drag-bars, substantially as shown and for the purpose described.

GEORGE E. HARTER.

Witnesses:
J. NELSON REID,
C. E. BRETHERTON.